July 20, 1926.

A. W. WILSON

AUTOMATIC PHONOGRAPH

Filed Nov. 18, 1921

Inventor
Arthur W. Wilson
By Church & Church
His Attorneys

Patented July 20, 1926.

1,593,112

UNITED STATES PATENT OFFICE.

ARTHUR W. WILSON, OF ANDERSON, SOUTH CAROLINA, ASSIGNOR TO JOHN MONDELLI, OF JACKSONVILLE, FLORIDA.

AUTOMATIC PHONOGRAPH.

Application filed November 18, 1921. Serial No. 516,153.

This invention relates to phonographs and has for its object the provision of a mechanism that will play a number of records one after the other without aid of the operator who merely selects the records to be played and places them in a receptacle.

It has frequently been desired to devise a phonograph mechanism that will relieve the operator of the need of constantly attending to the machine, and while machines have been devised that will play a single record over a number of times no satisfactory mechanism has so far been devised that will take records from a receptacle, play them and return them to the receptacle or to some other location, all of the movements being entirely automatic thus permitting the operator to hear any desired number of records of his own selection without any attention on his part and with but a slight delay in changing records.

The cabinet is made of ends 10 and 11, and side members 12 and 13, having a regular dome shaped cover, or a flat top in case the device is built in console type for example, as is the preferred type. This cover is not shown, forming no part of the invention. The base board supports practically the entire mechanism from beneath, and has openings to receive the turntable shaft 17, the tone arm cap 18, the oscillating shaft 19 which resets the tone arm, the shaft 20 by which the secondary spring is wound, and the pointer shaft 21 for indicating the condition of that spring.

Figure 1:
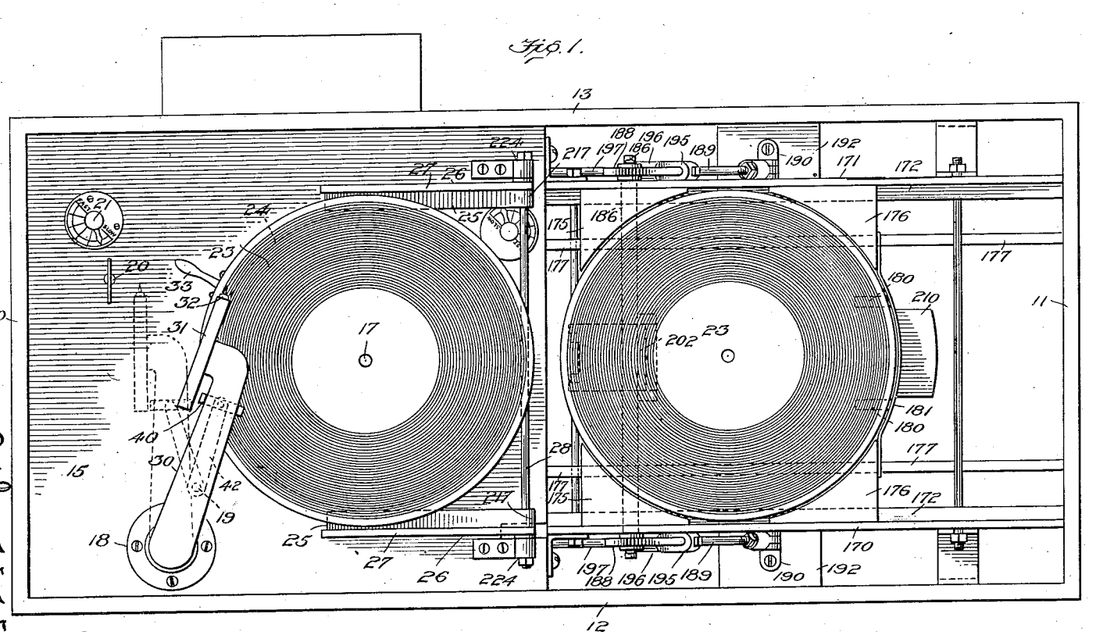
Figure 1 is a plan view of an automatic phonograph embodying the present invention.

The phonograph record disk 23 is shown lying on the turntable 24 (indicated in dotted lines in Fig. 1) above the horizontal flanges 25 of the shelf 26 and between the vertical flanges 27, the tips of the shelf resting upon the base board 15 and therefore being at a lower elevation than the opposite ends which are carried by a pivot rod 28 extending between the two sides 12 and 13. The tone arm 30, reproducer 31, needle holder 32, and automatic stop 33 are all of the usual type and therefore require no explanation.

Tone arm control.

Figure 5:
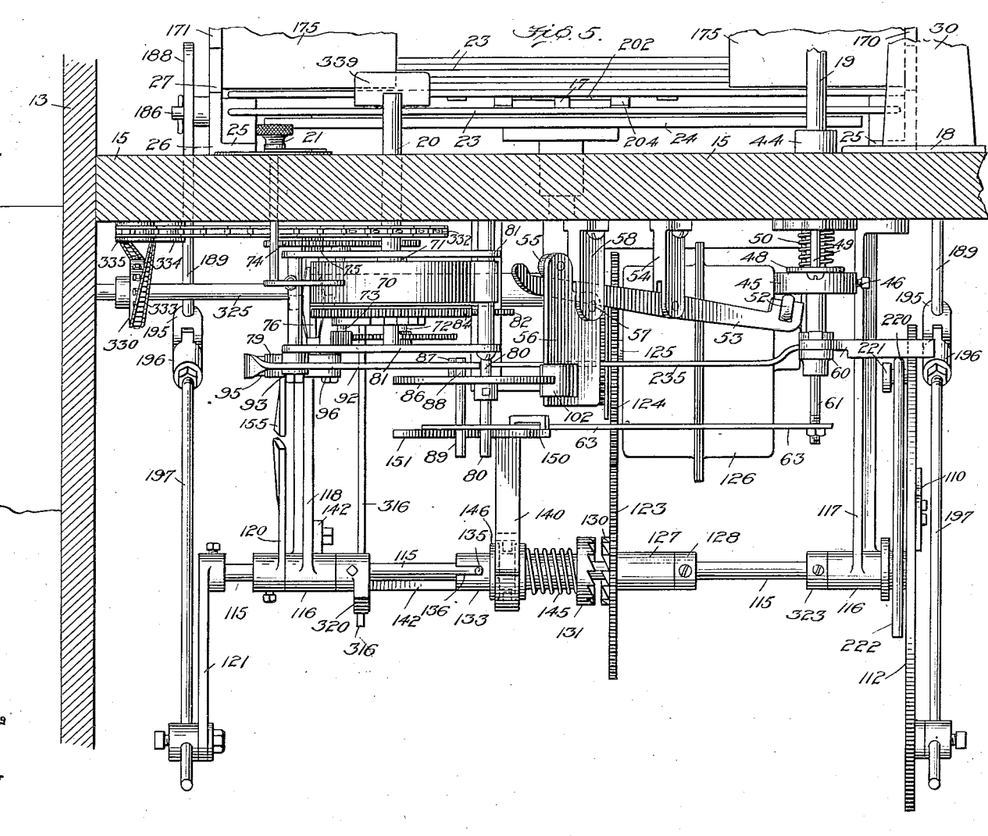
Fig. 5 is a rear view of the mechanism shown in Fig. 4.

The tone arm 30 rests in a yoke 40, pivoted on an adjustable pin 41 carried by the arm 42 fast on the oscillating vertical shaft 19 which passes through a ball bearing member 44, passing through the base 15 and secured to it as shown in Fig. 5. As the record is being played the needle will move from the edge of the record disk toward the center and this movement will cause a corresponding movement of the vertical shaft 19. A little distance below the base board 15 the shaft 19 carries a solid disk 45 adjustably secured in place by a set screw 46 to permit the use of various sized needles, the fiber needle, for example, being somewhat longer than a loud steel needle.

A saddle 48 loosely mounted on two headed screws 49 secured to the base, confines a spring 50 which urges the saddle against the disk 45, and also urges the latter downward, such movement lowering the tone arm and reproducer. Downward movement of the shaft 19 is limited by contact of the disk 45 with a roller 52 carried by the lever 53 pivoted in a post 54 secured to the base 15. The free end of the lever 53 engages an anti-friction roller 55 at the upper end of the swinging bracket 56 pivoted as at 57 to the lug 58. Movement of the swinging bracket about its pivot will depress the near end of the lever 53, and will raise the end carrying the roller 52, and since this roller engages a disk fixed to the shaft 19, the latter will be elevated, raising the tone arm, and consequently lifting the needle above the record 23.

Figure 4:
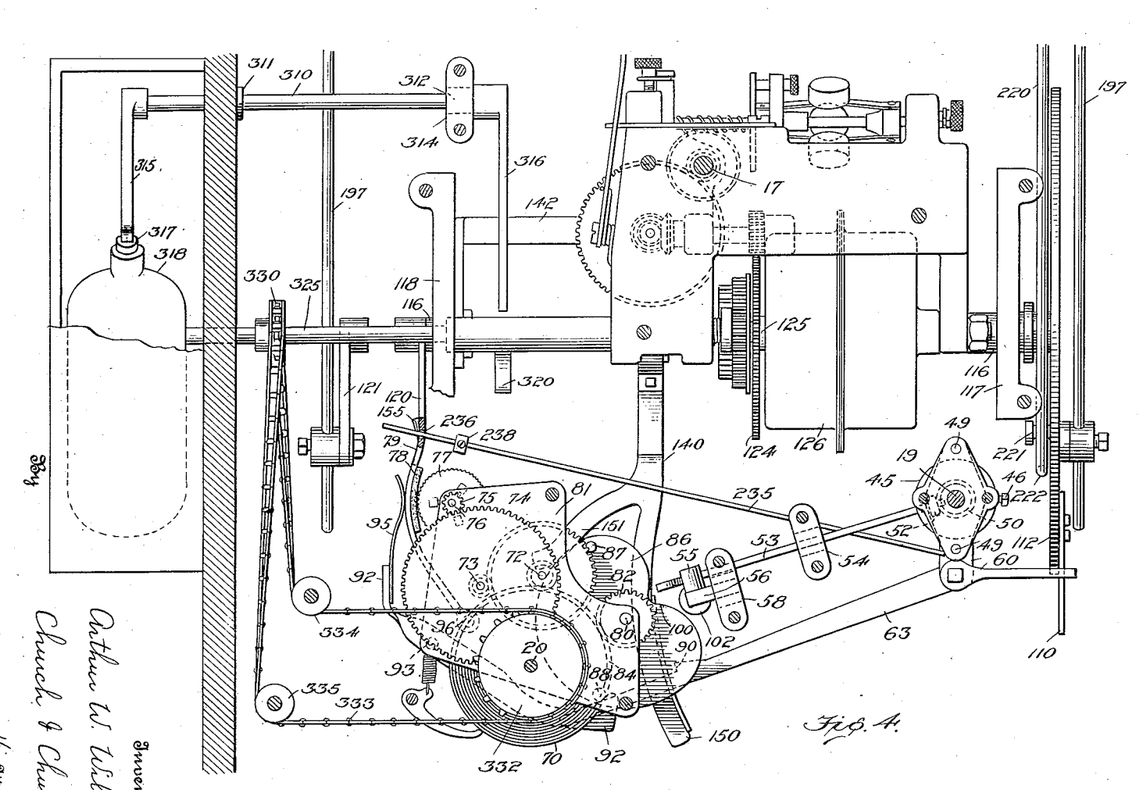
Fig. 4 is a top plan view of a portion of the mechanism, this view being taken directly beneath the base board.
Figure 7:
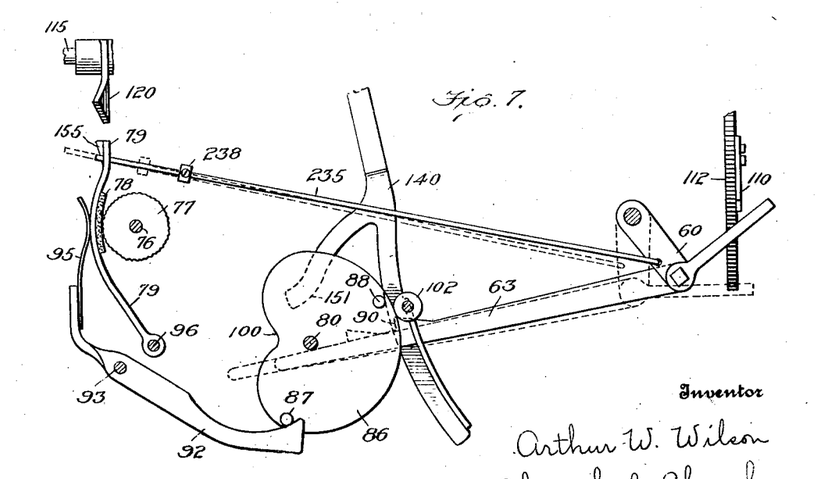

Side to side movement of the reproducer is taken care of partly through the contact of the needle with the record, and partly by the following mechanism: At its lower end the vertical tone arm control shaft 19 carries an angle 60, having at its corner a depending pin 61, on which is loosely held the shift arm 63. (Figs. 4, 5 and 7). Longitudinal movement of the shift arm 63 toward the pin 61 causes the needle (which has previously been raised above the record) to move from over the inner margin of the sound groove to a point to one side of the record disk, and movement imparted to the free end of the angle 60, as hereafter described, moves the needle to a point just above the outer edge of the sound groove and in position for playing when the tone arm has been lowered by return of the swinging bracket 56 to vertical position.

The secondary spring 70 is mounted on a friction sleeve 71 on the shaft 20 so that danger of breaking the spring by overwinding is avoided when the spring is automatically wound as is the preferred manner. Both schemes of winding are shown in the drawings, however, for the reason that for some styles, it may be preferred to wind the secondary spring by hand. This spring 70 drives a train of gears mounted on the arbors 72 and 73, the latter carrying a large gear 74 driving the pinion 75 on the governor shaft 76, which at its lower end carries a wheel 77 which is preferably made slightly rough on its periphery as the wheel 77 engages the brake shoe 78 of leather, secured to the brake arm 79, which therefore controls the operation of the mechanism driven by the spring 70.

A cam shaft 80 is mounted in the spring motor frame 81 and carries centrally a gear 82 meshing with the main gear 84 on the shaft 20 of the spring motor. A heart cam 86 is mounted on the cam shaft 80 and carries two brake operating pins 87 and 88, the former extending above the cam only, while the latter extends entirely through the cam, its lower end 89 engaging a shoulder 90 in the shift arm 63 to impart to the latter its longitudinal movement to shift the tone arm to record changing position. Each of these two pins cause the lever 92 to turn on its pivot 93 to bring the leaf spring 95 into contact with the brake arm 79 which is pivotally connected at 96 rather than at 93 (see Fig. 7) with the lever 92 in order to secure a quicker action. The pressing of the spring 95 against the brake arm 79 stops the rotation of the governor shaft 76 and consequently the rotation of the heart cam 86.

The heart cam 86 has a recess 100 in which the swinging bracket 56 (Figs. 4 and 5) lies when the latter is vertical which is its normal position when a record is being played. When the heart cam revolves, due to a release of the brake by the feeler rod 235 hereafter described, its periphery engages a vertically mounted roller 102 on the bracket 56, swings the latter about its horizontal pivot and raises the tone arm. When the heart cam shaft 80, however, has made half a revolution, the pin 87 has come into position to engage the lever 92, moving it to apply the brake, the spring motor mechanism coming to rest with the tone arm control shaft 19 elevated, and also shifted, since when the pin 88 was released, its lower end 89 came into contact with the shoulder 90 of the shift rod 63 and rotated the rod 19 to record changing position.

After the record disk has been changed the brake is again operated, this time by an arm 120 and brake extension 155 to be described later, and the heart cam shaft 80 completes its revolution, interrupted by the engagement of the pin 87 with the lever 92, lowering the tone arm by freeing the swinging bracket 56. Rotation of the heart cam is stopped at the proper time by engagement of the pin 88 with the lever 92.

Figure 2:
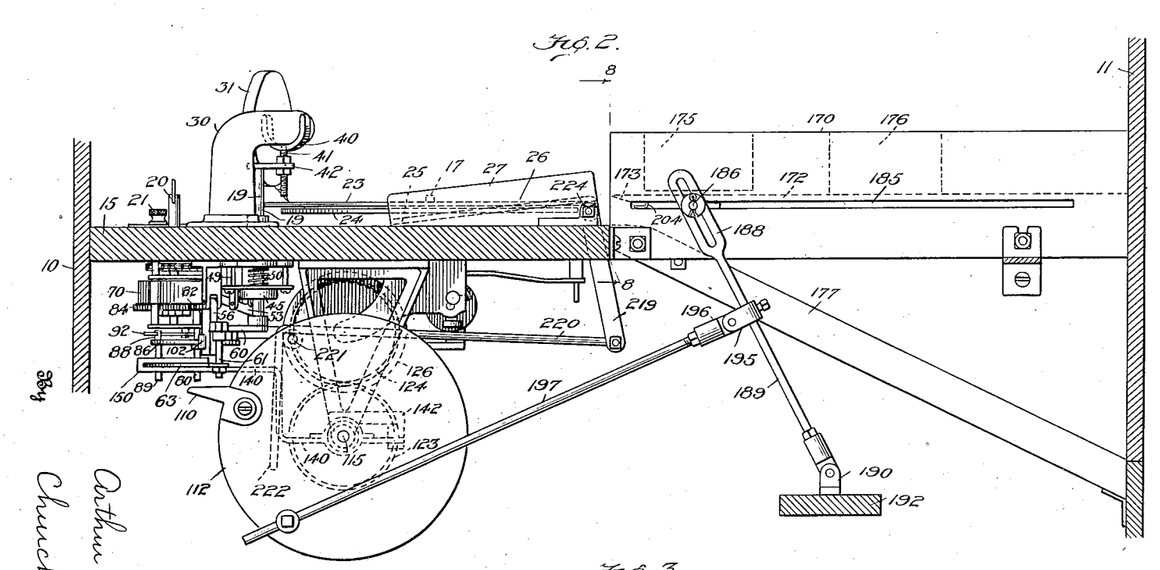
Fig. 2 is a side view thereof, parts of the cabinet being shown in section.
Figure 3:
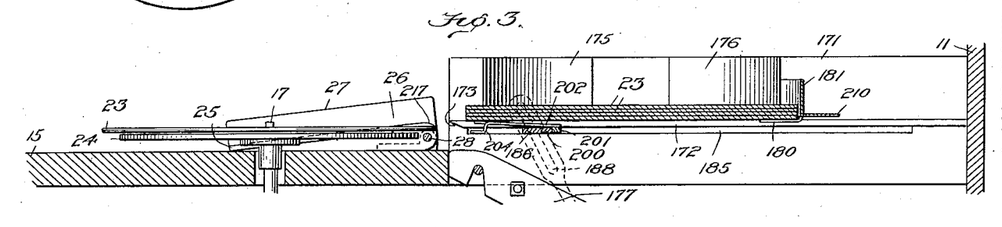
Fig. 3 is a vertical sectional view through a portion of the center of the device showing the turntable in elevation.

It will be remembered that when the record had finished playing, the tone arm was swung to a position to one side of the edge of the turntable, so that a further shifting of the tone arm is necessary while the latter is still elevated so that when the tone arm control shaft 19 is lowered the needle will be immediately over the initial end of the spiral sound groove in the record. This slight, but important movement is attained through the medium of the angle member 60 on the shaft 19, this angle member, in record changing position of the shaft 19, lying in the path of a projection 110 (Fig. 2) on a disk 112 fast to the main drive shaft 115. The engagement of the projection with the angle member shifts the tone arm the proper distance and also returns the shift arm 63 into position to be operated by the pin 89 on the heart cam 86.

*Drive shaft mechanism.*

The main drive shaft 115 (Fig. 5) is mounted in and extends through bearings 116 in the hangers 117 and 118, having on the one end the disk 112 and having on its other end double armed lever 120—121. At a point near the center of the main drive shaft is loosely mounted the driven gear 123 which is in mesh with the drive gear 124 on the shaft 125 of the main motor 126 which is preferably of the regulation type common in the phonograph art, having three or more coiled springs and an overwind preventer. As stated, the driven gear 123 is loose on the main drive shaft 115, and is integral with an extended hub 127 abutting the fixed collar 128 which positions the driven gear on the shaft, and also a clutch member 130 which is adapted to clutch with a cooperating element 131 on the clutch sleeve 133, the latter being free to slide on the main drive shaft, but held against relative rotation in any preferred way as by means of the pin and slot connection shown in the drawings, the pin 135 preferably passing entirely through the shaft, in which case there are two slots 136 in the sleeve 133.

Figure 6:
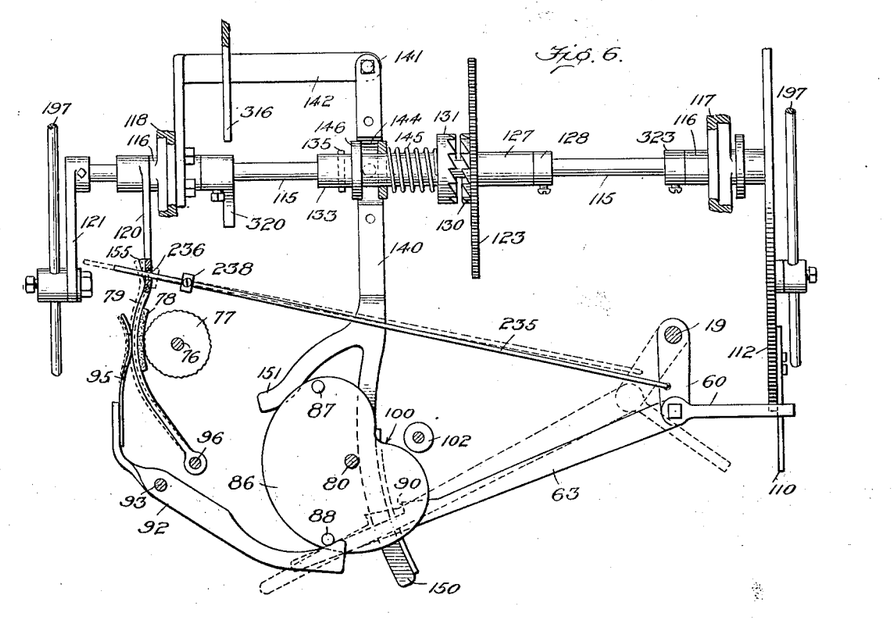
Figs. 6 and 7 are plan views showing the tone arm operating mechanism in different positions.

The clutch rod 140 is pivoted at 141 (Fig. 6) to a bracket 142 extending from the hanger 118, and is perforated as at 144 to receive the clutch sleeve 133. This rod 140 acts against a spring 145 on the sleeve in one direction and against a fixed collar 146 on the sleeve in the other direction, the latter disengaging the clutch while compression of the spring against the enlarged portion 131 of the sleeve forces the two clutch members into engagement and thereby causes the rotation of the main drive shaft, which, it might be stated, revolves only during record changing, making but one full revolution for each record played.

The clutch rod 140 is somewhat Y-shaped, the two arms 150 and 151 receiving between them the shaft of the heart-shaped cam 86, both being operated by the depending pin 89 on such cam. While a record is being played the rod 140 is in engagement with the collar or annular stop 146 immovably secured to the sleeve. When the heart cam starts to revolve, the pin 89, in addition to moving the shift arm 63, strikes against the arm 150 of the clutch rod and throws in the clutch, or rather, it compresses the coiled spring 145, and the latter throws in the clutch. This causes the main drive shaft to revolve and to operate the record changing mechanism. At the end of this cycle, the projection on the disk 112 strikes the angle 60 to move the tone arm control shaft to playing position but above the record, and a second later the arm 120 strikes a depending extension 155 (Figs. 5 and 7) integral with the brake lever 79, releasing the secondary spring motor 70, again revolving the heart cam 86, throwing out the clutch by engagement of the pin 89 with the arm 151 of the clutch rod 140, and then lowering the needle on the record by the swinging bracket 56 entering the recess 100 in the cam.

*Record changing mechanism.*

Figure 8:
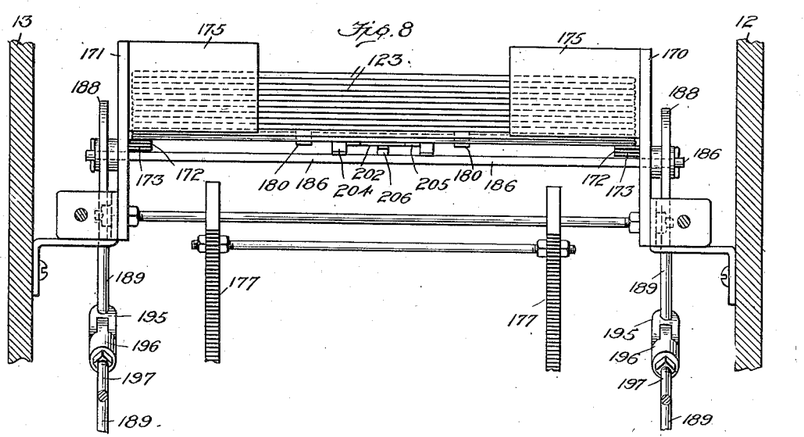
Fig. 8 is a vertical section on the line 8—8 of Fig. 2.
Figure 9:
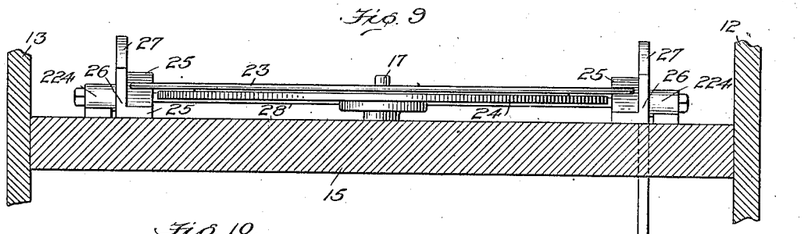
Fig. 9 is a vertical elevation showing the discharge shelf.

The magazine for holding the records to be played is formed from two side members 170 and 171 (Fig. 8) each having a central longitudinal inward-extending flange 172 blunt at the rear end, but preferably sharpened as at 173 at the front end to allow for the passage of a played record into the receiving chute 177. Spacer blocks 175 and 176 are secured to each side member, the rear blocks 176 resting on the ledge or flange 172, while the front blocks 175 are elevated above the ledge by the thickness of a record. These blocks have opposed arcuate faces (see Fig. 1) to receive the records which rest on the side ledges and on inward extending lugs 180 carried by the rear shield 181, and bear on the record selector itself to the extent of holding it horizontal.

The two side members are slotted as at 185 (Fig. 10) to receive the actuator bar 186 which is rectangular in cross section between the side members, but is cylindrical where it extends beyond these side members, and is received by forks 188 at the upper extremities of the rocker arms 189 pivoted to brackets 190 (Fig. 2) carried by the cross piece 192 extending from side to side of the cabinet. The two rocker arms each carry on adjustable lug 195, pivoted to a coupling member 196 forming the upper end of a connector bar 197 operated by rotation of the main drive shaft, one of these bars 197 being pivoted to the disk 112 while the other is pivoted to the crank arm 121, both of these connections being adjustable.

The actuator bar 186 has secured to it at its central portion a bracket 200 which forms bearings for a small rectangular block 201 which forms the means for pivoting the selector 202, the latter being a flat sheet of metal having two downturned fingers 204 adapted to slip beneath a record while the two somewhat shorter fingers 205 in the plane of the metal, extend above the record. A spring 206 secured to the actuator bar and to the block 201 tends to hold the selector elevated when no records are in the magazine, and against the lowest record when the magazine is filled. A rearwardly directed horizontal extension 210 (Fig. 10) on the shield prevents raising of the selector 202 when the actuator bar is at the rearward limit of its travel and consequently beyond the records in the magazine.

The discharging shelf consists of two similar side members 26 each having a ledge 25, beveled at its front end 217, and extending the entire length of the shelf. One of the side members is provided with a downwardly extending arm 219 (Fig. 2) to the lower end of which is pivoted a hook 220, the longer member of which rests on a stud 221 on the disk, and the shorter arm 222 at right angles to the major portion is engaged by this stud when the disk rotates, this action causing the hook to be pulled toward the front of the machine and thus tilting the discharge shelf on its pivot 224. The ledges 25 on the discharge shelf clear the turntable 24, but the side members 27 are spaced just sufficiently to snugly receive the records, the ledges 25 therefore lying beneath the margin of the record which in every case is of greater diameter than the turntable. It will be seen that the tilting of the shelf raises the record from the turntable and elevates it to such a degree that the record slides by gravity down the shelf and to the receiving chute 177. When the stud 221 is below the axis of the disk 112, the hook rests upon the main drive shaft 115 and is raised from such position as the stud passes mid-position.

*Feeler mechanism.*

For the sake of simplicity, the machine is illustrated for use with records of the Brunswick type, i. e., where every record ends at exactly the same distance from the center of the disk, although it will be understood that the device is intended for use with all types of records, utilizing a different style of feeler for those records which end at varying distances from the center as for example, the Victor and Columbia records.

A stop rod 235 (Figs. 4, 5, 6 and 7) is pivoted to the angle 60 and extends loosely through a small orifice 236 in the brake arm 79, and carries a stop 238 which is adjusted on the rod to strike against the brake arm when the needle crosses a point just outside of the inner circular end of the sound groove. As soon as the music on the record ceases, the needle is directed by a wide spiral to the circular portion and in passing to this portion, the brake is released, starting the changing mechanism.

Figures 12, 13, 14, 15, 16:
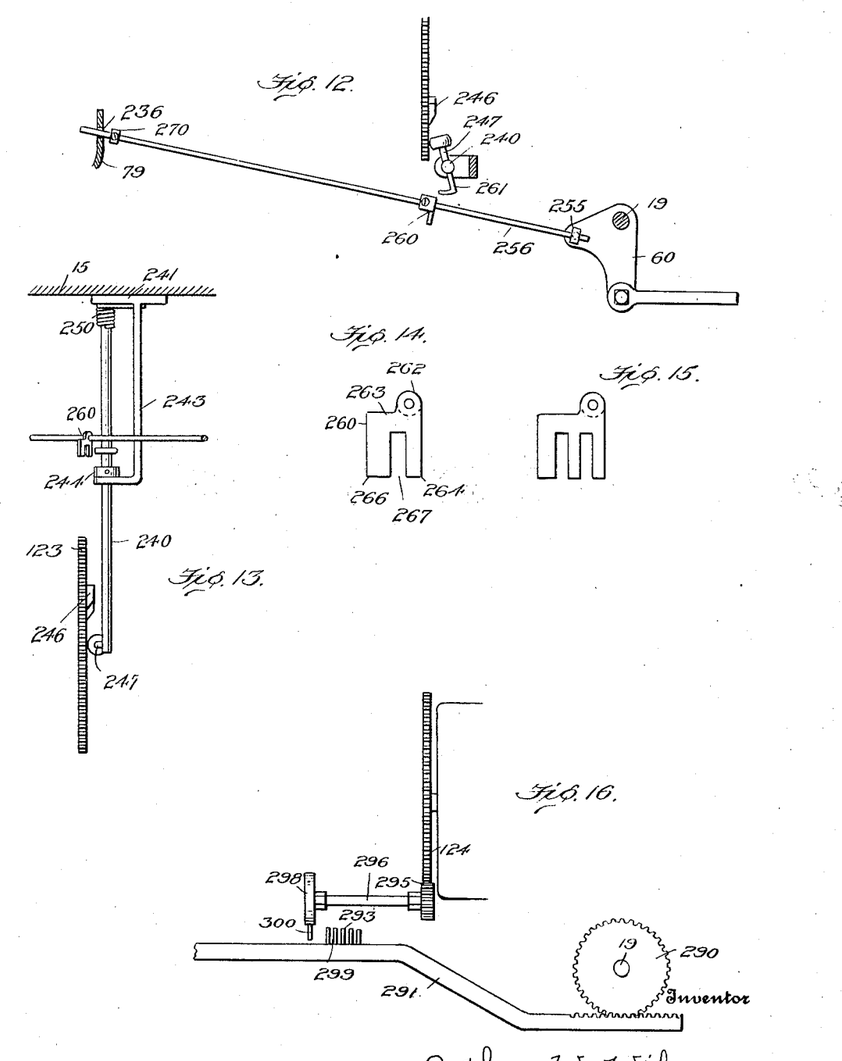
Fig. 12 is a plan view of a modification of the feeler mechanism.
Fig. 13 is an elevation of the mechanism shown in Fig. 12.
Fig. 14 is a view of the comb.
Fig. 15 is a similar view of a modified comb.
Fig. 16 shows an additional modification of the feeler mechanism.

A simple but efficient type of feeler mechanism for records in which the sound groove may end at any distance from the center of the disk is illustrated in Figs. 12 and 13. In this modification, the shaft 240 has a guiding bearing 241 fastened to the base board 15, the other bearing being had in a bracket 243, on which rests the collar 244 fixed on the shaft 240. The loosely mounted, constantly rotating, gear 123 carries a small cam plate 246 which engages the angular finger 247 on the lower end of the shaft 240 moving it against the tension of the spring 250 which tends to hold the finger 247 against the face of the gear 123, so that a slight oscillation of th vertical shaft 240 occurs at each revolution of the horizontal main drive shaft on which the loose gear 123 is mounted.

The bracket 60 at the lower end of the tone arm control shaft 19 is pierced to receive the circular portion of the pivot head 255 of the feeler rod 256 which extends through the orifice 236 of the brake arm 79. Movement of the tone arm control shaft 19 about its axis therefore imparts a swinging movement to the feeler rod 256 which moves about its point of engagement with the brake rod as an axis, such swinging movement of the feeler rod bringing the comb 260 into the path of the feeler 261 carried by the shaft 240 just above its support 243.

The comb 260 (Fig. 14) consists of a head 262 from which extends a bar 263 provided with one or more teeth 264 of uniform width and a final tooth 266 of greater width, each of the teeth being separated by spaces 267 equal in width to the width of the teeth 264. I prefer the form of comb shown in Fig. 14 having but two teeth to that shown in Fig. 15 where the comb is shown with three teeth and will consequently describe the preferred form only, the sole difference being in the number of teeth 264.

The loose gear 123 constantly rotates and hence for each revolution of the turntable the gear 123 moves through a certain arc. In the standard type talking machine motor the train of gears is such that for each revolution of the main motor shaft the turntable revolves about forty times so that the feeler will oscillate at least five times for an ordinary short record, six times for the usual record and seven times for an exceptionally long record, the usual radial length of the sound groove running from a little more than two inches to nearly three inches, corresponding to from two hundred turns to say two hundred and seventy-five turns. Such exceptional records as have less than two hundred and one turns cannot be played with the two toothed comb, but must be played with the three toothed comb, or else stopped by hand.

As the needle travels toward the center of the record disk the comb moves toward the feeler but does not cross the path of the feeler until immediately after the fifth oscillation of the feeler, corresponding to a distance of two inches from the initial edge of the sound groove. If the record sound groove contains less than two hundred and forty turns, the travel of the needle, and consequently of the comb will have ceased before the feeler makes its next "feel" or oscillation, so that the feeler will strike the tooth 264, pushing the feeler rod in the direction of the brake arm 79, and will release the governor brake, since the rod 240 carries an adjustable stop collar 270 similar to the stop 238 and for the same purpose.

Should the record be of greater size than two hundred and forty turns, the comb will be in such position that the feeler will enter the space 267 between the teeth on its next "feel" and will therefore not operate the feeler rod nor release the brake. On its next oscillation, however, the feeler will strike the wider finger 266 and will then release the brake, moving the tone arm to record changing position and starting in operation the other mechanism.

A third type of feeler mechanism is shown in Fig. 16, this type being of wider possibilities, and much quicker of action. It is not the preferred type, however, for the reason that while there may be certain high priced records that may not be played with the two toothed comb, I have never seen a popular piece record that would not operate my two toothed comb. In this third type of feeler mechanism the wide toothed gear 290 mounted on the tone arm control shaft 19 in addition to angle member 60 meshes with a horizontal feeler rod 291 which is substituted for feeler rod 235. Feeler rod 291 is provided with a considerable number of teeth 293 which are square or rectangular in cross section and are spaced apart the thickness of one of the teeth.

A small pinion 295 on the horizontal shaft 296 meshes with the main drive gear 124 on the motor shaft. A one-toothed wheel 298 on the shaft 296 passes through the spaces 299 between the teeth 293 as long as the gear 290 on the tone arm control shaft is moving, the tooth 300 on the wheel 298 also being rectangular in cross section and such width as to be snugly between adjacent teeth 293 on the feeler rod. When the needle finishes the record it passes from the spiral sound groove to the circular groove at the end of the record and consequently when the tooth 300 makes its next revolution it will strike one of the teeth 293, raising the flexible feeler rod and releasing the brake, starting the record changing cycle. It will be noted that this feeler is quite similar to the second type, but is a trifle more sensitive, the former requiring a maximum of thirty seconds to release the brake after cessation of the music while the third type never requires more than three seconds.

Winding mechanism.

The rocking shaft 310 (Fig. 4) has a bearing 311 in the side member 13, and a journal 312 in the post 314 carried by the base board 15. The two arms 315 and 316, form with the shaft a bell crank lever, the arm 315 being adapted to contact with the starting button 317 of a winding motor 318 of any preferred type, the electric motor illustrated being known as a motrola, while the inner arm 316 of the lever lies in the path of a cam 320 on the main drive shaft 115. The cam 320 serves the dual purpose of operating the motor and for preventing longitudinal or axial movement of the main drive shaft, together with the collar 323 fixed to the shaft and bearing against the journal on hanger 117.

At each revolution of the main drive shaft the cam operates the bell crank lever to depress the button of the electric motor and wind the main drive spring motor 126 in exactly the same manner as when wound by hand, the motrola being connected to the winding shaft 325 of the spring motor. This motrola also may drive the secondary spring motor 70 by means of a sprocket 330 on the winding shaft 325 of the main spring motor. The winding shaft 20, which extends through the base board 15 so that it may be wound by hand if desired, carries a sprocket gear 332 just below the base board 15, this gear being driven by a chain 333 which connects the sprockets 330 and 332 and being guided by the idle chain guide wheels 334 and 335. In case the motor 70 is not provided with an overwind preventing device it will be necessary to connect these two pulleys by a belt that may slip when the motor is fully wound, but I prefer to use the overwind preventer and to connect the shafts 325 and 334 by a chain and sprockets. Owing to the very considerable cost of the electric motor it may be desired to supply a type of machine in which the phonograph may be wound entirely by hand and for this reason I have shown the machine as adapted to either hand or machine winding. For hand winding the two spring motors are entirely separate, the main motor, which will play from three to six or more records and which may be wound while a record is being played, is wound by a crank of the usual type applied to the winding shaft 325, the electric motor and crank arm 315 being omitted, and the secondary spring motor is wound by the winding key 339 at the top of the shaft 20.

Operation.

The various cycles have each been explained in their regular order but for convenience they will be briefly recapitulated in chronological order. When the needle reaches the circular inner margin of the sound groove, the feeler rod 256 or 291, or the simpler but quite similar stop rod 235, releases the brake arm 79, freeing the brake wheel 77 on the governor shaft 76. The spring 70, by means of the meshing gears 84 and 82 rotates the heart cam 86. This cam swings the bracket 56, which through the lever 53 raises the tone arm, and in addition turns the tone arm after raising it, this being accomplished by the heart cam carried pin 89 striking the shift arm 63.

Figure 10:
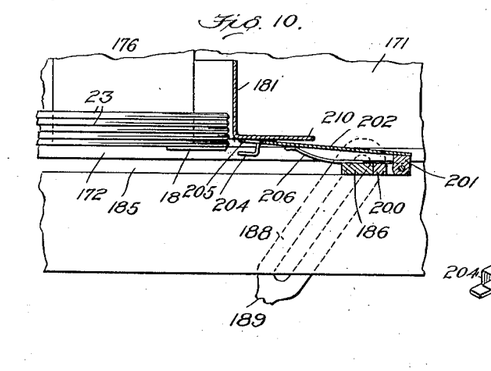
Fig. 10 is a fragmentary vertical elevation showing the selector mechanism with relation to the records to be played.
Figure 11:
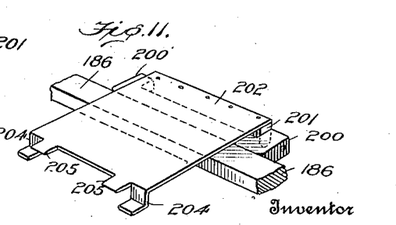
Fig. 11 is a perspective of the selector.

This turning of the tone arm restores the stop rod to initial position and also places the angle 60 in the path of the projection 110 on the disk 112. Just before the heart cam ceases its movement it throws in the clutch 130—131 which locks the main drive shaft 115 to the main motor 126. The rotation of the heart cam 86 is stopped by one of its pins 87 shifting the lever 92 which applies the brake, so that for a brief period of time the heart cam and main drive shaft are both rotating. The needle now being raised and in initial or record changing position, the stud 221 pulls the hook 220 raising the discharge shelf on its pivotal axis 224 until the tilt is sufficiently great to discharge the played record by gravity, the record sliding down the receiving chute 177. The discharge shelf is now lowered by its spring to normal position. While the discharge shelf was being tilted the selector 202 was moved from its position near the front limit of its travel to its extreme rearward position beneath the protecting extension 210. As the discharge shelf lowers to normal position the selector moves forward under the pile of records in the magazine, engaging the lowermost one, the fingers 205 sliding between the lowest two records, and the longer fingers 204 supporting the lowest record from beneath. The selected record now slides on the ledges 171 until its edge is somewhat over the smooth rounded center pin 17 of the turntable. The record is now supported at its rear by the relatively wide selector and by the pin 17 near the center of the record. The rockers continue to move until the hole in the record is over the pin at which time the record falls in place on the turntable. The pitmen 197 now pass over center and the selector recedes to a position just below the pile of records entirely out of the way (Fig. 10). A slight further rotation of the main drive shaft brings the projection 110 into contact with the angle 60, swinging the tone arm to position immediately over the initial end of the sound groove, and immediately thereafter the arm 120 on the main drive shaft 115 strikes the cam extension on the brake arm, releasing the heart cam 86 which now completes its revolution, lowering the needle on the record by means of the swinging bracket 56, lever 53, fixed collar 45, and spring 50. The pin 88 on the heart cam engages the brake applying lever 92 and also the main drive shaft clutch release arm 151, thus throwing the entire mechanism out of operation except the turntable revolving mechanism and the loose gear 123 which parts are constantly rotating at all times. To stop the phonograph and all mechanism at any time during the playing of a record, it is merely necessary to apply the usual turntable brake 33.

What I claim is:

1. A phonograph of the type in which a disk record is rotated upon a turntable and the tone arm is moved in one direction by the movement of the needle in the sound groove of the record, characterized by the provision of a shaft, said shaft being rotatable by the tone arm, a motor for returning said tone arm to initial position, a brake restraining said motor, and means connected to the shaft and brake for releasing said brake when the tone arm reaches the end of the sound groove.

2. In a phonograph of the type in which a needle is carried by a reproducer at the end of a tone arm and such needle rests within the sound groove of a phonograph record mounted on a revolving turntable; a shaft, a motor for rotating said tone arm about its pivot, said shaft being rotatable by said tone arm, means for raising the needle from the record, a brake restraining said motor, and connections between the shaft and brake for releasing said brake when the tone arm has been swung to a position in which the needle is at the end of the sound groove.

3. In a phonograph of the type in which a needle is carried by a reproducer at the end of a tone arm and such needle rests within the sound groove of a phonograph record mounted on a revolving turntable; a shaft, a motor for rotating said tone arm about its pivot, said shaft being rotatable by said tone arm, means for raising the needle from the record, a brake restraining said motor, connections between the brake and shaft for releasing said brake when the tone arm has been swung to a position in which the needle is at the end of the sound groove, and means for lowering said needle upon the initial end of a record on said turntable.

4. In a phonograph, a pivoted tone arm, a shaft, a motor for turning said tone arm about its pivot, a brake restraining said motor, means connected to said shaft for releasing said brake upon completion of a given angular movement of said tone arm, and independent means for restoring said brake to motor restraining position upon completion of a predetermined angular movement of said tone arm in a reverse direction, means for removing a record from the turntable and substituting another therefor, and additional mechanism for releasing said brake after operation of said record changing mechanism.

5. In a phonograph, a turntable adapted to support a disk record, a discharge shelf pivoted at one side of said turntable, a receiving chute, and means for turning said discharge shelf about its pivot to move it relatively to the turntable and raise a record to a position spaced above said turntable and discharge same into said receiving chute.

6. In a phonograph, a turntable, a tone arm, a discharge shelf including a pair of parallel arms pivoted at one side of the turntable, means for removing said tone arm from contact with a record on said turntable, and means operable after removal of said tone arm for moving said discharge shelf about its pivot to remove the record from the turntable.

7. In a phonograph, a receptacle adapted to hold a number of disk records, a shaft, means controlled by said shaft for removing the tone arm mechanism from contact with a played record, and means operable upon completion of the movement of said means including a discharge shelf and a cooperating discharge chute, said shelf being movable with respect to the turntable for removing the played record from the turntable and for removing a record from said receptacle and placing it upon said turntable.

8. In an automatic phonograph, a receptacle adapted to hold a plurality of disk records, and a selector adapted to reciprocate beneath the records in said receptacle and to remove the lowermost record from said receptacle and to slide it upon the turntable.

9. In an automatic phonograph, a turntable, a pivoted discharge shelf movable with respect to the turntable, a record holding receptacle, means for operating said discharge shelf to raise a record to a position spaced above the turntable to remove said record from the turntable, and means operable to remove a record from said receptacle and to slide the same into position above said discharge shelf.

10. In an automatic phonograph, a record holding receptacle, a selector, means for reciprocating said selector beneath said receptacle, yieldable means for holding said selector elevated, and means for guiding said selector into record engaging position.

11. In an automatic phonograph, a turntable, a discharge shelf, a pair of parallel pivoted arms for slidably removing a record from said turntable and mechanism controlled by the position of the tone arm for setting in operation said record removing means.

12. In a phonograph, a turntable adapted to support a record, reproducing means including a tone arm, a motor, connections between the motor and turntable for rotating said turntable, means controlled by the position of said arm for regulating the operation of the motor, a main shaft adapted to be driven by said motor, clutch controlled connections for operatively connecting said motor and said shaft, a yoke, means for raising said yoke to lift said tone arm from said record when same has been played and for rotating said tone arm about its pivot to a point beyond the periphery of said record and for throwing-in said clutch, means operatively connected to said main shaft for removing a played record from the turntable and for replacing it with an unplayed record, and means rotatable with said main shaft for causing said tone arm mechanism to swing said tone arm to initial playing position and to throw out said clutch.

13. In an automatic phonograph, a turntable, a motor, connections between the motor and turntable for driving said turntable, a shaft, clutch controlled connections for operatively connecting said shaft and said motor, a second motor, a brake yieldably holding said second motor from operation, a cam driven by said second motor, a swinging bracket, a lever controlled by said bracket for raising said tone arm, a tone arm shifting lever, mechanism carried by said shaft for removing a record from said turntable, additional and independent mechanism operable from said shaft for placing a second record upon said turntable, and cooperating means carried by said shaft and said tone arm control lever for releasing said brake to cause said cam to revolve to lower said tone arm through movement of the swinging bracket and the connected lever and to disconnect the turntable driving motor and said shaft.

14. In a phonograph, a pivoted tone arm, a shaft, an arm carried by said shaft, a pivoted yoke carried by said arm and adapted to embrace said tone arm, motor driven mechanical connections for raising and lowering said shaft, and motor driven mechanical connections for turning said shaft axially.

15. In a phonograph, a tone arm control shaft, a collar on said shaft, motor driven mechanical connections for moving said shaft axially, means for rotating said shaft in one direction, motor driven mechanical connections for rotating said shaft in the opposite direction, and additional means movable with said shaft for setting in operation said last mentioned means.

16. In a phonograph, a base, a tone arm pivoted thereto, a vertical tone arm control shaft loosely mounted in said base, means for raising said vertical shaft, means acting in opposition to said means, a turntable adapted to support a disk record, discharge means adapted to remove a record from said turntable, and means carried by said discharge means for rendering inoperative said tone arm shaft raising mechanism.

17. In an automatic phonograph, a turntable, a pivoted tone arm, a pivoted shaft, mechanism connected to said shaft for raising and lowering said tone arm and for turning it about its pivot, said means including a motor, a brake for said motor, a feeler rod pivotally connected to said shaft and carrying an adjustable stop member adapted to contact with said brake to release said motor and cause movement of said tone arm about its pivot, resilient means for reapplying said brake, and independently operable means for again releasing said brake.

18. In a phonograph, a turntable adapted to support a record, a motor for driving said turntable, a pivoted tone arm, means operated by said motor for removing a played record from said turntable and for replacing it with an unplayed record, a second motor, mechanism driven by said second motor for moving said tone arm to one side of said turntable and for simultaneously setting in operation said record changing mechanism, and means carried by said record changing mechanism for causing the operation of said tone arm control mechanism to return said tone arm to initial playing position.

19. In an automatic phonograph, a turntable, a motor for driving said turntable, a disk driven by said motor, a projection on said disk, a pivoted lever in the path of said projection, a pivoted tone arm, means for withdrawing said tone arm from contact with the record being played, restraining means for holding said last-mentioned means inoperative, a rod loosely mounted in said restraining means and slidably connected to said tone arm control mechanism, a stop member on said rod, a comb adjustably mounted on said rod and adapted to be moved by rotation of said tone arm into contact with said lever, and means for moving said comb into contact with said lever, whereby said stop is moved into contact with said restraining means rendering the latter inoperative.

20. In a stop mechanism for automatic phonographs, a turntable adapted to support a disk record, a lever adapted to oscillate at regular intervals determined by the speed of rotation of said turntable, a tone arm movable about its pivot by contact of the reproducing needle and the record, a motor, a brake resiliently holding said motor from operating, a rod mounted for reciprocation in said brake, a stop on said rod, and a member carried by said rod and movable into the path of said lever.

21. In a phonograph, a turntable, means for rotating said turntable, a pivoted tone arm, a shaft parallel to the pivotal center or axis of rotation of the tone arm, means on said shaft for raising said tone arm and moving same about its pivot to a point beyond the periphery of said turntable, and additional means also on said shaft for returning the tone arm to playing position.

22. In a phonograph, a turntable, means for rotating said turntable, a pivoted tone arm, a shaft parallel to the pivotal center or axis of rotation of the tone arm, means on said shaft for raising said tone arm and moving same about its pivot to a point beyond the periphery of said turntable, and additional means also on said shaft for returning the tone arm to playing position and for lowering same onto the record.

23. In a phonograph, a turntable, means for rotating said turntable, a pivoted tone arm, a shaft parallel to the pivotal center or axis of rotation of the tone arm, means on said shaft for raising said tone arm and moving same about its pivot to a point beyond the periphery of said turntable, means for bringing said mechanism to rest upon completion of said movement, and additional means also on said shaft for returning the tone arm to playing position and for subsequently lowering same onto the record.

24. In a phonograph, a turntable, means for rotating said turntable, a pivoted tone arm, a shaft parallel to the pivotal center or axis of rotation of the tone arm, means on said shaft for raising said tone arm and moving same about its pivot to a point beyond the periphery of the turntable, means for bringing said mechanism to rest upon completion of said movement, and additional means also located on said shaft for returning the tone arm to playing position and for subsequently lowering same onto the record.

25. In a phonograph, a turntable, means for driving said turntable, a pivoted tone arm, a shaft to which said tone arm is connected, means for raising said shaft and tone arm, means movable with respect to the turntable for raising and sliding a record from said turntable while said tone arm is thus raised, and means operable upon the removal of such record from the turntable for sliding a second record upon said turntable, and means operable upon placing of said second record on the turntable to cause said tone arm raising mechanism to lower said tone arm.

26. In a phonograph, a turntable, means for driving said turntable, a pivoted tone arm, means for raising said tone arm, means movable with respect to the turntable for raising and sliding a record from said turntable while said tone arm is thus raised, means operable upon the removal of such record from the turntable for sliding a second record over said record raising means upon said turntable, and means operable upon placing of said second record on the turntable to cause said tone arm raising mechanism to lower said tone arm.

27. In a phonograph, a turntable, means for rotating said turntable, a pivoted tone arm, a shaft parallel to the pivotal center or axis of rotation of the tone arm, means on said shaft for raising said tone arm and moving same about its pivot to a point beyond the periphery of said turntable, and additional means also on said shaft for returning the tone arm to playing position, means for raising and sliding a record from the turntable, means for placing a new record on the turntable, said last two mentioned means operating when the tone arm is at rest beyond the periphery of the turntable.

28. A turntable, means for rotating said turntable, a pivoted tone arm, a shaft mechanism connected to said shaft and operable when the tone arm reaches a chosen distance from the turntable axis for raising said tone arm and moving same about its pivot to a point beyond the periphery of the turntable and for subsequently returning said tone arm to initial playing position, means for simultaneously rendering inoperative said tone arm raising mechanism until same is set in motion by independent means governed by the position of the tone arm.

ARTHUR W. WILSON.